3,300,522
PROCESS FOR THE PREPARATION OF 17α-HYDROXY-16,20-DIKETO PREGNANES
Patrick A. Diassi, Westfield, N.J., assignor, by mesne assignments, to E. R. Squibb & Sons, Inc., New York, N.Y., a corporation of Delaware
No Drawing. Filed Mar. 29, 1965, Ser. No. 443,669
5 Claims. (Cl. 260—397.4)

This invention relates to a new chemical process for preparing 17α-hydroxy-16,20-diketo steroids.

The process of this invention essentially comprises reacting a 16,20-diketo steroid of the pregnane (including the pregnene, pregnadiene and pregnatriene series), unsubstituted in the 17-position, with a peracid.

Among the suitable peracids may be mentioned hydrogen peroxide and organic peracids, such as perbenzoic acid, haloperbenzoic acids (e.g., m-chloroperbenzoic acid), (lower alkyl)perbenzoic acids (e.g., pertoluic acid), perthalic acid, and per(lower alkanoic) acids (e.g., peracetic acid). Although the proportion of peracid to steroid reactant is not critical, preferably at least about 1 mole of peracid is present per mole of steroid, and optimally about 1 to about 3 moles of peracid per mole of steroid is used. The reaction is carried out under normal conditions, such as ambient temperature and pressure, preferably in the presence of an organic solvent for the steroid reactant.

Among the suitable steroid substrates are all steroids of the pregnane series that are unsubstituted in the 17-position and contain keto groups in at least the 16 and 20-positions. Such steroids include 16-ketoprogesterone,
16-keto-A-norprogesterone,
16-keto-1-dehydroprogesterone,
16-keto-6-dehydroprogesterone,
16-keto-11-desoxycorticosterone and 21-esters thereof,
16-keto-1,6-tetrahydroprogesterone,
16-ketopregnenolone,
6α-methyl-16-ketoprogesterone,
16β-chloro-16-ketoprogesterone,
6α-fluoro-16-ketoprogesterone,
9α-halo-11β-hydroxy-16-ketoprogesterones (such as 9α-fluoro-11β-hydroxy-16-ketoprogesterone),
9α-halo-11,16-diketoprogesterones,
9α-halo-11β-hydroxy-16-keto-1-dehydroprogesterones,
9α-halo-11β-hydroxy-16-keto-6-dehydroprogesterones,
6α,9α-dihalo-11β-hydroxy-16-ketoprogesterones,
9α-halo-16-ketocorticosterones and 21-esters thereof (such as 9α-fluoro-16-ketocorticosterone and its 21-acetate),
9α-halo-16-keto-1-dehydrocorticosterones and 21-esters thereof (such as 9α-fluoro-16-keto-1-dehydrocorticosterone and its 21-acetate),
9a-halo-16-keto-6-dehydrocorticosterones and 21- esters thereof,
9α,21-dihalo-11β-hpdroxy-16-ketoprogesterones,
9a-21-dihalo-11β-hydroxy-16-keto-1-dehydroprogesterones,
9a,21-dihalo-11β-hydroxy-16-keto-6-dehydroprogesterones,
9a-halo-11β-hydroxy-16-keto-A-norprogesterones,
16-keto-19-norprogesterone,
16-keto-19-norcorticosterone,
6a-halo-11β-hydroxy-16-ketocorticosterones and their 21-esters,
and 6a-halo-11-β-hydroxy-16-keto-1-dehydrocorticosterones and their 21-esters.

The products obtained correspond to the steroid reactant but contain a 17a-hydroxy group. Thus, for example, by employing 16-ketoprogesterone as the reactant, 16-keto 17a-hydroxyprogesterone, a steroid having progestational activity, is obtained. The other 17a-hydroxy steroids formed possess glucocorticoid activity if they contain a 11β-hydroxy or 11-keto group, and progestational activity if there is no substitution in the C-ring.

The following examples illustrate the invention:

EXAMPLE 1

*16-keto-17a-hydroxyprogesterone*

To a solution of 215 mg. (0.65 mmol) of 16-ketoprogesterone in 4 ml. of chloroform are added 150 mg. o: m-chloroperbenzoic acid and the resulting solution lef at room temperature for two hours. It is then dilutec with 20 ml. of chloroform and washed with an equa volume of 5% sodium bicarbonate followed by water The organic phase is then dried over sodium sulfate anc evaporated to dryness in vacuo. Crystallization of the residue from acetone-hexane gives about 158 mg. of 16 keto-17α-hydroxyprogesterone having a melting poin about 205–207° C., $[\alpha]_D^{25}$ —90.7° (chloroform), $\lambda_{max}^{alc.}$ 239 mμ($\epsilon$, 18,700), $\lambda_{max}^{CDCl_3}$ 3550, 3450, 1756, 1708 1681 cm.$^{-1}$, $\tau_{CDCl_3}^{Si(CH_3)_4}$ 4.25 (s., 4–H), 7.73 (s., 21–Me) 8.98 (s., 19–Me), 9.01 (s., 18–Me).

*Analysis.*—Calcd. for $C_{21}H_{28}O_4$ (344.44): C, 73.22 H, 8.19. Found: C, 72.99; H, 8.24.

EXAMPLE 2

*16-keto-17α-hydroxy-A-norprogesterone*

(a) *Preparation of A-norpregn-3-en-2,16,20-trione.*— To a solution of 600 mg. of 16α-hydroxy-A-norproges terone in 150 ml. of reagent grade acetone, 8 ml. of at acetone-water (9:1, v:v) solution containing 20 mg. o $CrO_3$ and 32 mg. of sulfuric acid per milliliter are addec dropwise with stirring. After 10 minutes a few drop: of methanol are added, the mixture diluted with wate: and partially evaporated in vacuo. It is then extractec with chloroform which is washed with water, dried ove: sodium sulfate and evaporated to dryness. Crystalliza tion of the residue from acetone-hexane or ether give: about 400 mg. of A-norpregn-3-en-2,16,20-trione havin melting point of about 128–130° C.

(b) *Preparation of 16-keto-17α-hydroxy-A-norproges terone.*—To a solution of 157 mg. (0.5 mmol) of 16 keto-A-norprogesterone in 4 ml. of chloroform are addec 120 mg. of m-chloroperbenzoic acid and the resultin solution kept at room temperature for two hours. Fol lowing the procedure of Example 1 there is obtainec about 98 mg. of 16-keto-17α-hydroxy-A-norprogesteron( having a melting point about 218–220° C., $\lambda_{max}^{alc.}$ 232 mμ ($\epsilon$, 19,800) $[\alpha]_D^{22}$ —197° (chloroform), $\lambda_{max}^{Nuj}$ 2.98, 5.70, 5.89, 6.18μ, $\tau_{CDCl_3}^{Si(CH_3)_4}$ 4.23 (s., 4–H), 7.7: (s., 21–Me), 8.78 (s., 19–Me), 9.03 (s., 18–Me).

*Analysis.*—Calcd. for $C_{20}H_{26}O_4$ (330.41): C, 72.70 H, 7.93. Found: C, 72.77; H, 7.79.

Similarly, any other 17-unsubstituted 16,20-diketo steroid of the pregnane series may be substituted for the 16-ketoprogesterone in the procedure of Example 1 tc yield the corresponding 17α-hydroxy-16,20-diketo derivative as the product obtained.

Moreover, if any other peracid is substituted for the m-chloroperbenzoic acid in the procedures of either Example 1 or 2, the same product is obtained.

The invention may be variously otherwise embodied within the scope of the appended claims.

What is claimed is:

1. A process for preparing a 17α-hydroxy-16,20-diketo steroid of the pregnane series which comprises interacting a 17-unsubstituted 16,20-diketo steroid of the pregnane series with a peracid.

2. The process of claim 1 wherein the peracid is an organic peracid.

3. The process of claim 1 wherein the peracid is m-chloroperbenzoic acid.

4. The process of claim 1 wherein the steroid is 16-ketoprogesterone.

5. The process of claim 1 wherein the steroid is 16-keto-A-norprogesterone.

No references cited.

ELBERT L. ROBERTS, *Primary Examiner.*